(12) United States Patent
Liu

(10) Patent No.: US 10,696,258 B2
(45) Date of Patent: Jun. 30, 2020

(54) VEHICLE WINDOW STRUCTURE FOR PREVENTING PERSON FROM BEING THROWN OUT

(71) Applicant: Chun-Nan Liu, Taichung (TW)

(72) Inventor: Chun-Nan Liu, Taichung (TW)

( * ) Notice: Subject to any disclaimer, the term of this patent is extended or adjusted under 35 U.S.C. 154(b) by 44 days.

(21) Appl. No.: 16/190,889

(22) Filed: Nov. 14, 2018

(65) Prior Publication Data

US 2019/0275975 A1 Sep. 12, 2019

(30) Foreign Application Priority Data

Mar. 8, 2018 (TW) .............................. 107107921 A

(51) Int. Cl.
| | | |
|---|---|---|
| *B60R 21/06* | (2006.01) | |
| *B60J 1/20* | (2006.01) | |
| *B32B 17/06* | (2006.01) | |
| *B32B 5/02* | (2006.01) | |
| *B61D 25/00* | (2006.01) | |
| *B60R 21/00* | (2006.01) | |
| *B60R 21/02* | (2006.01) | |

(Continued)

(52) U.S. Cl.
CPC .............. *B60R 21/06* (2013.01); *B32B 5/028* (2013.01); *B32B 17/067* (2013.01); *B60J 1/20* (2013.01); *B61D 25/00* (2013.01); *B60R 2021/0018* (2013.01); *B60R 2021/028* (2013.01); *B60R 2021/065* (2013.01); *E06B 3/66* (2013.01); *E06B 5/10* (2013.01)

(58) Field of Classification Search
CPC ............ B60R 21/06; B60R 2021/0018; B60R 2021/028; B60R 2021/065; B32B 5/028; B32B 17/067; B60J 1/20; B61D 25/00; E06B 3/66

USPC ......................................................... 280/749
See application file for complete search history.

(56) References Cited

U.S. PATENT DOCUMENTS

| | | | | |
|---|---|---|---|---|
| 1,969,521 | A * | 8/1934 | Oman .................... | B60J 1/2044 |
| | | | | 160/276 |
| 1,982,455 | A * | 11/1934 | Sansbury ............... | B60J 1/2011 |
| | | | | 160/88 |

(Continued)

FOREIGN PATENT DOCUMENTS

| | | | | |
|---|---|---|---|---|
| EP | 0958975 A1 * | 11/1999 | ............. | F41H 5/013 |
| KR | 100469121 B1 * | 1/2005 | ............ | B60J 1/2011 |

*Primary Examiner* — Paul N Dickson
*Assistant Examiner* — Hilary L Johns
(74) *Attorney, Agent, or Firm* — Pai Patent & Trademark Law Firm; Chao-Chang David Pai

(57) ABSTRACT

A vehicle window structure for preventing a person from being thrown out, applied to a vehicle, includes a fixing frame. An inner frame surface of the fixing frame is provided with a plurality of fixing portions spaced apart from each other. An arresting net includes at least one plastic rope fixedly connected to the fixing portions in an interlaced manner. The fixing frame is provided with a light-permeable unit that is mounted and fixed within the inner frame surface and covers the arresting net. When the vehicle has an accidental rollover unfortunately, even if the light-permeable unit is damaged or the fixing frame is deformed during the overturning of the vehicle, the arresting net is still able to arrest the user effectively because the arresting net is directly fixed to the fixing frame, thereby preventing the user from being thrown out of the vehicle.

10 Claims, 12 Drawing Sheets

(51) Int. Cl.
*E06B 3/66* (2006.01)
*E06B 5/10* (2006.01)

(56) References Cited

U.S. PATENT DOCUMENTS

| | | | | |
|---|---|---|---|---|
| 2,297,729 | A * | 10/1942 | Thomas | E06B 9/52 160/238 |
| 3,525,535 | A * | 8/1970 | Yasusaburo | B60R 21/06 280/749 |
| 5,192,112 | A * | 3/1993 | Gherardi | B60J 1/2011 160/90 |
| 5,469,906 | A * | 11/1995 | Cason | B60J 1/2011 160/105 |
| 5,524,694 | A * | 6/1996 | Arapis | B60J 1/2011 160/354 |
| 6,016,861 | A * | 1/2000 | Davis | B60J 1/1853 160/105 |
| 6,059,313 | A * | 5/2000 | Coogan | B60R 21/026 280/749 |
| 6,276,426 | B1 * | 8/2001 | Polak | B60J 1/1853 160/105 |
| 8,376,019 | B2 * | 2/2013 | Van Klompenburg | E05C 17/24 160/107 |
| 2002/0190513 | A1 * | 12/2002 | Svetlik | B60R 21/06 280/749 |
| 2004/0040672 | A1 * | 3/2004 | Nagar | B60J 1/2025 160/98 |
| 2007/0240833 | A1 * | 10/2007 | Watson | B60R 21/06 160/105 |
| 2008/0014398 | A1 * | 1/2008 | Tueshaus | B29C 70/688 428/38 |
| 2015/0191148 | A1 * | 7/2015 | Chiciu | B60P 3/38 280/749 |

\* cited by examiner

VEHICLE WINDOW STRUCTURE FOR PREVENTING PERSON FROM BEING THROWN OUT

FIELD OF THE INVENTION

The present invention relates to a vehicle window structure, and more particularly to a vehicle window structure for preventing a person from being thrown out.

BACKGROUND OF THE INVENTION

Considering the safety of passengers, a vehicle is provided with several airbags. These airbags are connected with an inflator. Several detectors are installed in the vehicle. When any of the detectors detects an impact of the vehicle, the inflator instantaneously generates a large amount of gas to be injected into the airbags, so that the airbags are inflated instantaneously to prevent the head and chest of the passenger from hitting hard objects in the vehicle, thereby protecting the safety of the driver and the passengers.

Although the above-mentioned airbag protects the passenger's riding safety, according to the inventor's observation, if the vehicle is overturned in an accident, because the airbag is not fixed to the vehicle after being inflated and the air may be slowly deflated over time, the passenger may be thrown out of the vehicle via a vehicle window subjected to the violent shaking and centrifugal force generated by the overturning of the vehicle, causing serious casualties. Especially, for vehicles with fixed windows, such as buses, trains, etc., having numerous windows, if all the windows are installed with airbags, the overall installation cost is higher, and the mechanism design is more complicated. The fixed window usually has a large window area, so the airbag takes more time to be inflated for covering the entire window. Since the passenger of the vehicle with the fixed window does not wear the seat belt, the force that hits the window during the overturning of the vehicle is relatively great and the passenger is more likely to be thrown out of the vehicle. Accordingly, the inventor of the present invention has devoted himself based on his many years of practical experiences to solve these problems.

SUMMARY OF THE INVENTION

The primary object of the present invention is to provide a vehicle window structure for preventing a person from being thrown out. The vehicle window structure can be installed in a vehicle, which effectively prevents the user from being thrown out of the vehicle when the vehicle rolls over, thereby improving the safety of the vehicle greatly.

In order to achieve the above object, the vehicle window structure for preventing a person from being thrown out of the present invention comprises a fixing frame, an arresting net, and a light-permeable unit. The fixing frame has an outer frame surface and an inner frame surface. An opening is defined within the inner frame surface. The fixing frame is provided with a plurality of fixing portions spaced apart along the inner frame surface. The arresting net is mounted and fixed within the inner frame surface to close the opening. The arresting net includes at least one plastic rope fixedly connected to the fixing portions in an interlaced manner. The light-permeable unit is mounted and fixed within the inner frame surface. The light-permeable unit covers the arresting net.

The vehicle window structure for preventing a person from being thrown out of the present invention may be applied to a vehicle having a fixed window. The vehicle window structure may be used as a general window in a normal state. When the vehicle has an accidental rollover unfortunately, even if the light-permeable unit is damaged or the fixing frame is deformed during the overturning of the vehicle, the arresting net is still able to arrest the user effectively because the arresting net is directly fixed to the fixing frame, thereby preventing the user from being thrown out of the vehicle and improving the safety of the vehicle greatly.

DETAILED DESCRIPTION OF THE PREFERRED EMBODIMENTS

Embodiments of the present invention will now be described, by way of example only, with reference to the accompanying drawings.

Figure 1:
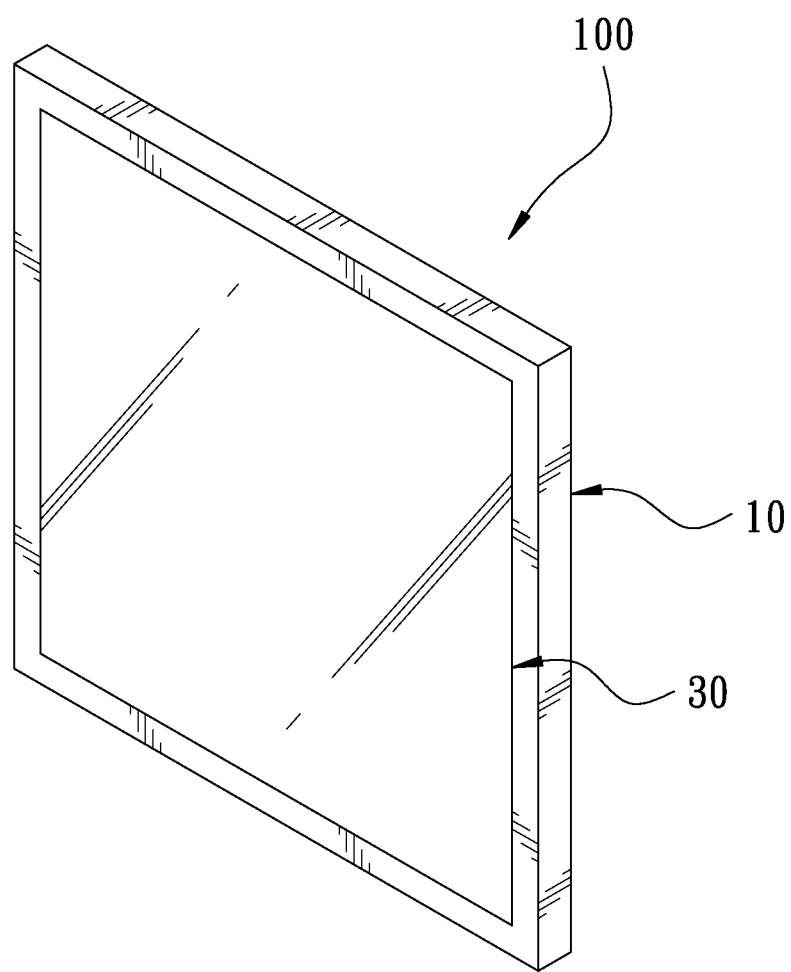
FIG. 1 is a perspective view in accordance with a first embodiment of the present invention.
Figure 2:
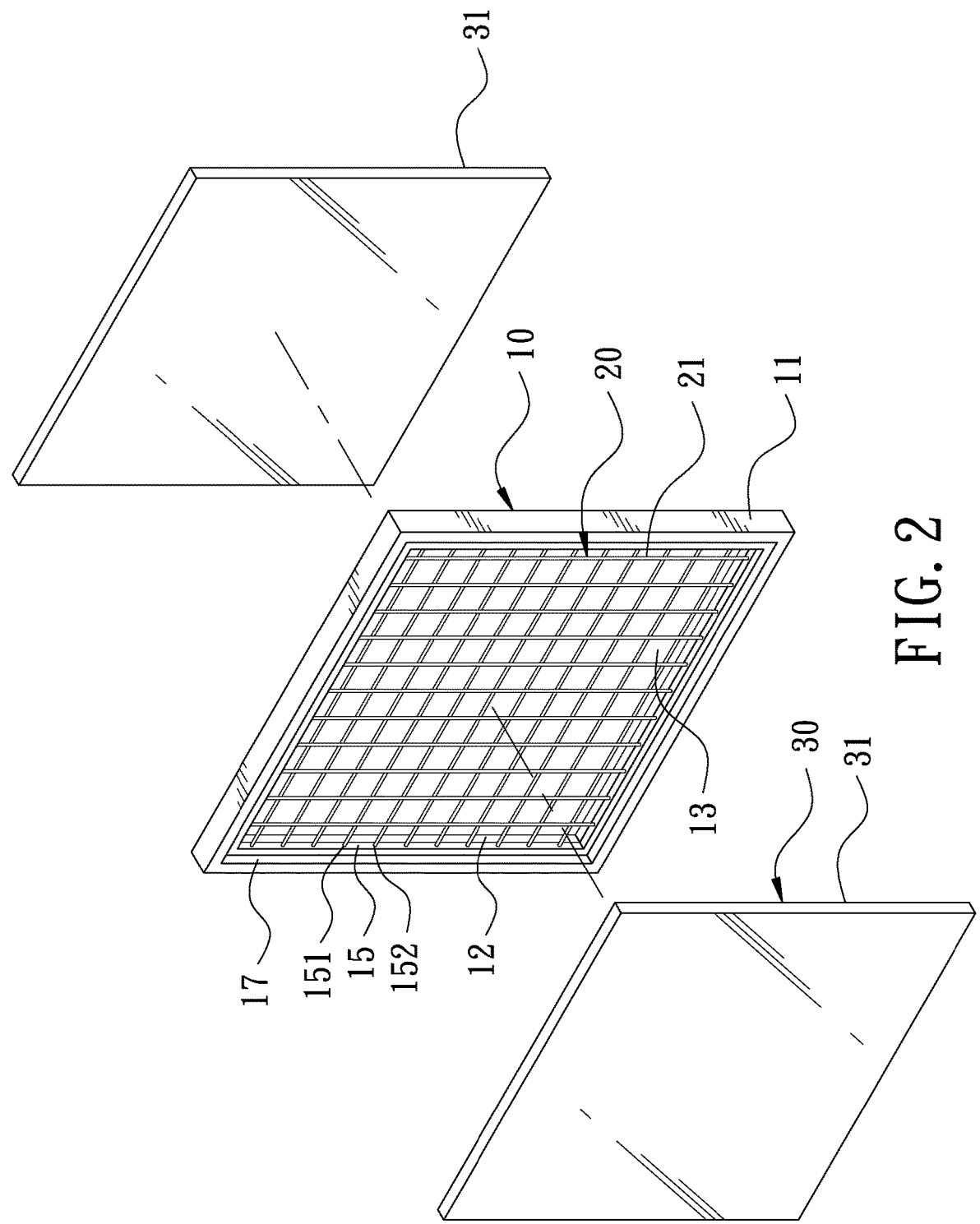
FIG. 2 is an exploded view in accordance with the first embodiment of the present invention.
Figure 3:
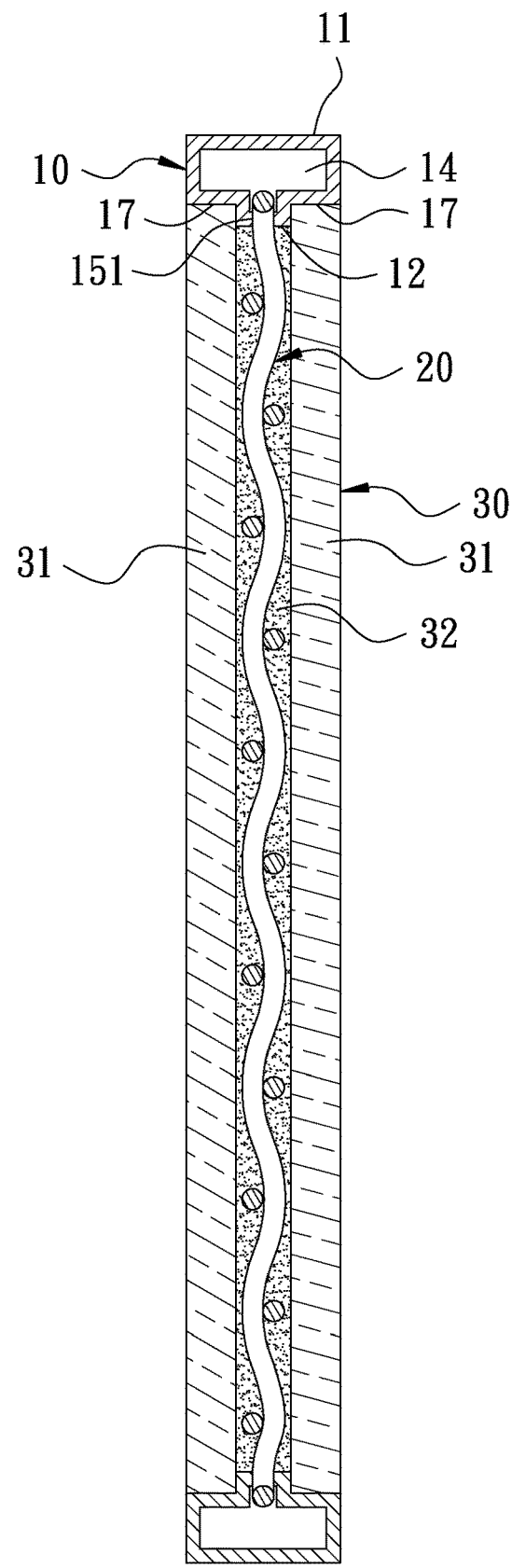
FIG. 3 is a sectional view in accordance with the first embodiment of the present invention.

FIG. 1 is a perspective view in accordance with a first embodiment of the present invention. FIG. 2 is an exploded view in accordance with the first embodiment of the present invention. FIG. 3 is a sectional view in accordance with the first embodiment of the present invention. The present invention discloses a vehicle window structure 100 for preventing a person from being thrown out. The vehicle window structure 100 comprises a fixing frame 10, an arresting net 20, and a light-permeable unit 30.

The fixing frame 10 has an outer frame surface 11 and an inner frame surface 12. An opening 13 is defined within the inner frame surface 12. The fixing frame 10 has a passage 14 therein. The fixing frame 10 is provided with a plurality of fixing portions 15 spaced apart along the inner frame surface 12. The inner frame surface 12 has an inlet 151 and an outlet 152 corresponding to each of the fixing portions 15 and communicating with the passage 14. The fixing frame 10 is provided with at least two positioning portions 16 passing through the inner frame surface 12. In this embodiment, the positioning portions 16 are perforations passing through the inner frame surface 12 and communicating with the passage 14. In addition, two sides of the fixing frame 10 are provided with annular fixing grooves 17 corresponding to the opening 13.

Figure 4:
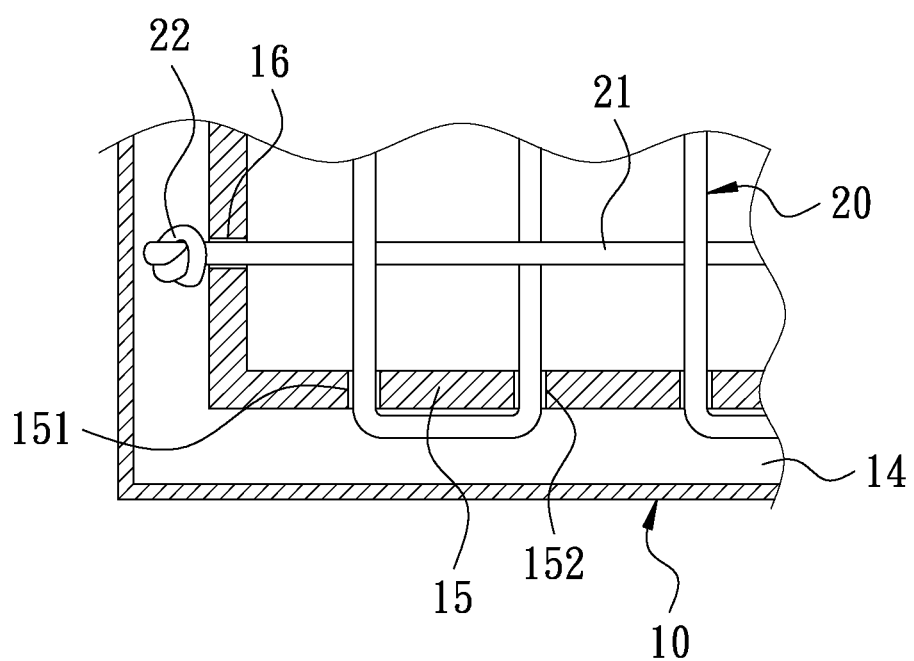
FIG. 4 is a partial sectional view in accordance with the first embodiment of the present invention.
Figure 5:
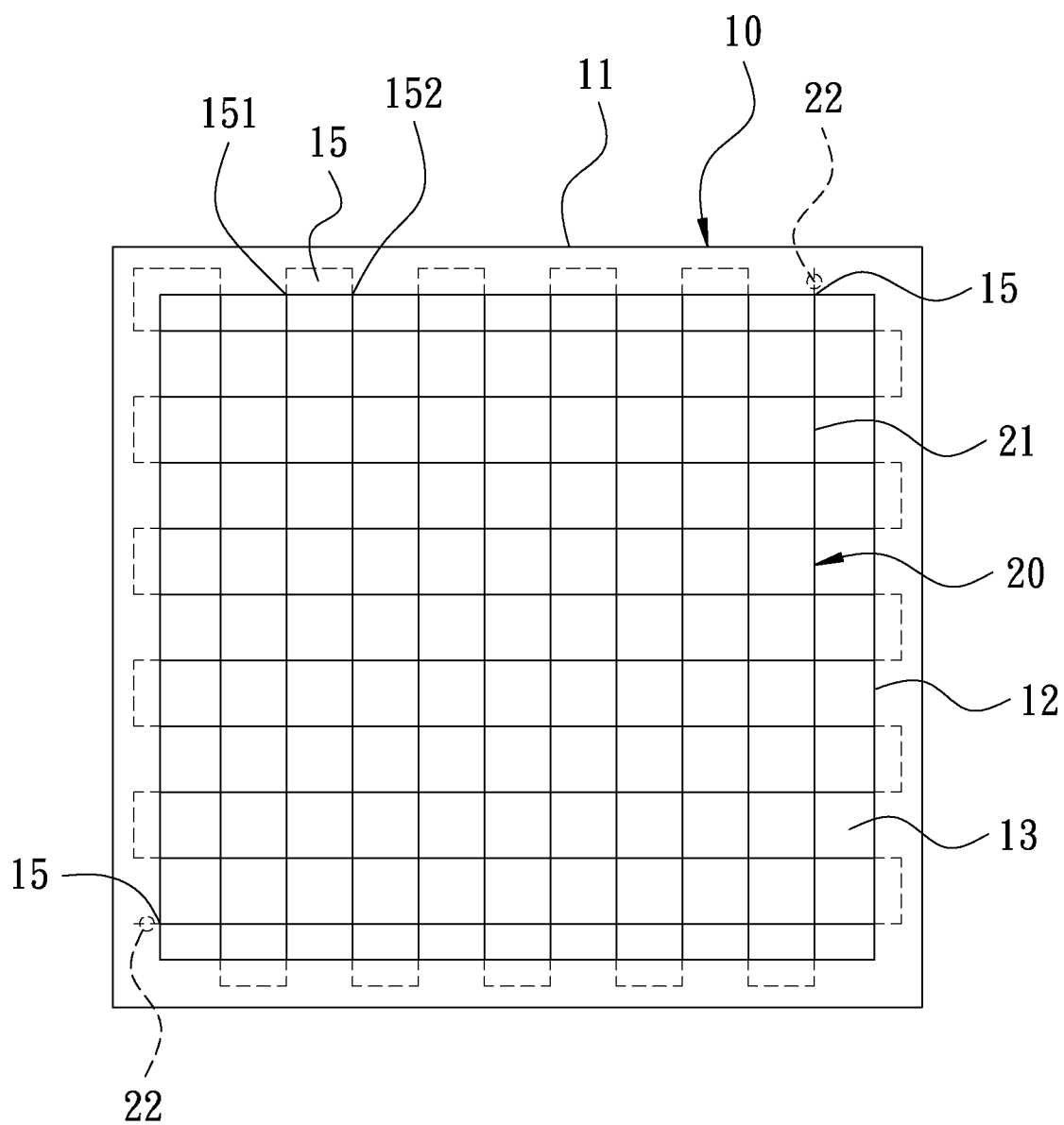
FIG. 5 is a schematic view showing the arresting net in accordance with the first embodiment of the present invention.

The arresting net 20 is mounted and fixed within the inner frame surface 12 to close the opening 13. The arresting net 20 includes at least one plastic rope 21 fixedly connected to the fixing portions 15 in an interlaced manner. In this embodiment, please referring to FIG. 4 and FIG. 5 again, the arresting net 20 is composed of a single plastic rope 21 made of transparent nylon. The plastic rope 21 is inserted in the passage 14 via the inlet 151 and then out of the passage 14 via the outlet 152, so that the plastic rope 21 is wound around and fixed to the fixing portions 15. After two ends of the plastic rope 21 are inserted in the passage 14 via the positioning portions 16 respectively, the two ends of the plastic rope 21 are tied to form knot portions 22 each having a diameter greater than that of the positioning portions 16, such that the two ends of the plastic rope 21 are connected and fixed to the positioning portions 16, respectively. It should be noted that the arresting net 20 may be composed of a plurality of plastic ropes 21. This embodiment only discloses one of the embodiments and does not limit the scope of the present invention.

The light-permeable unit 30 is mounted and fixed within the inner frame surface 12 and covers the entire arresting net 20. In this embodiment, the light-permeable unit 30 includes two light-permeable plates 31 respectively disposed at two sides of the arresting net 20. The light-permeable plates 31 are fixed to the annular fixing grooves 17 respectively, so that the arresting net 20 is sandwiched between the light-permeable plates 31. The light-permeable unit 30 further includes a glue layer 32 between the light-permeable plates 31 for gluing and fixing the light-permeable plates 31 and the arresting net 20. The light-permeable plates 31 may be made of glass or acryl.

Figure 6:
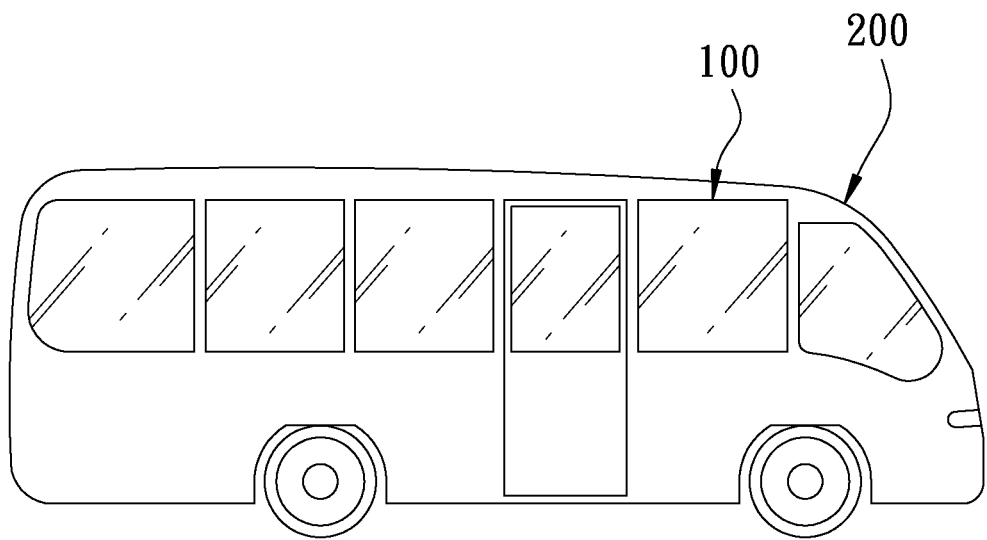
FIG. 6 is a schematic view of the first embodiment of the present invention when in use.
Figure 7:
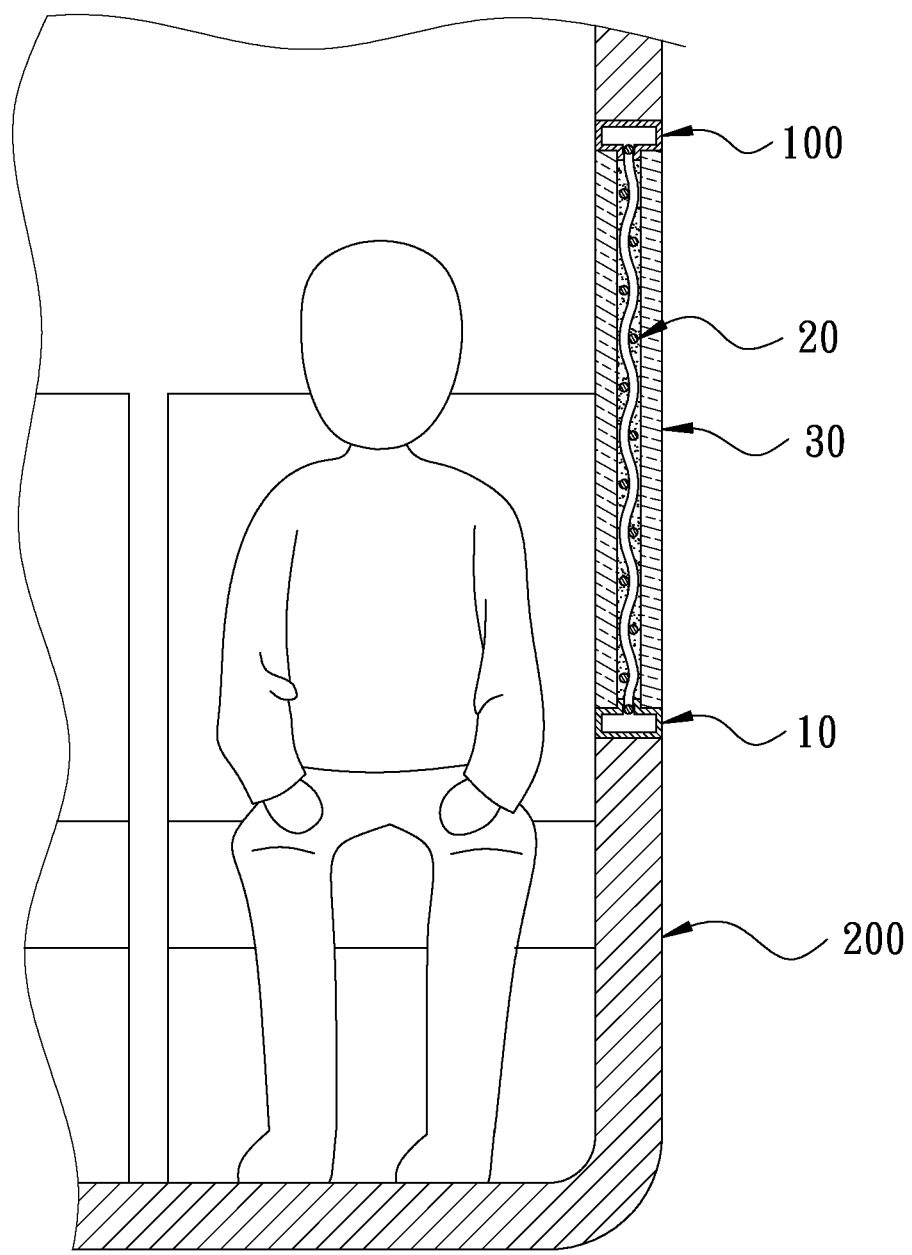
FIG. 7 is another schematic view of the first embodiment of the present invention when in use.
Figure 8:
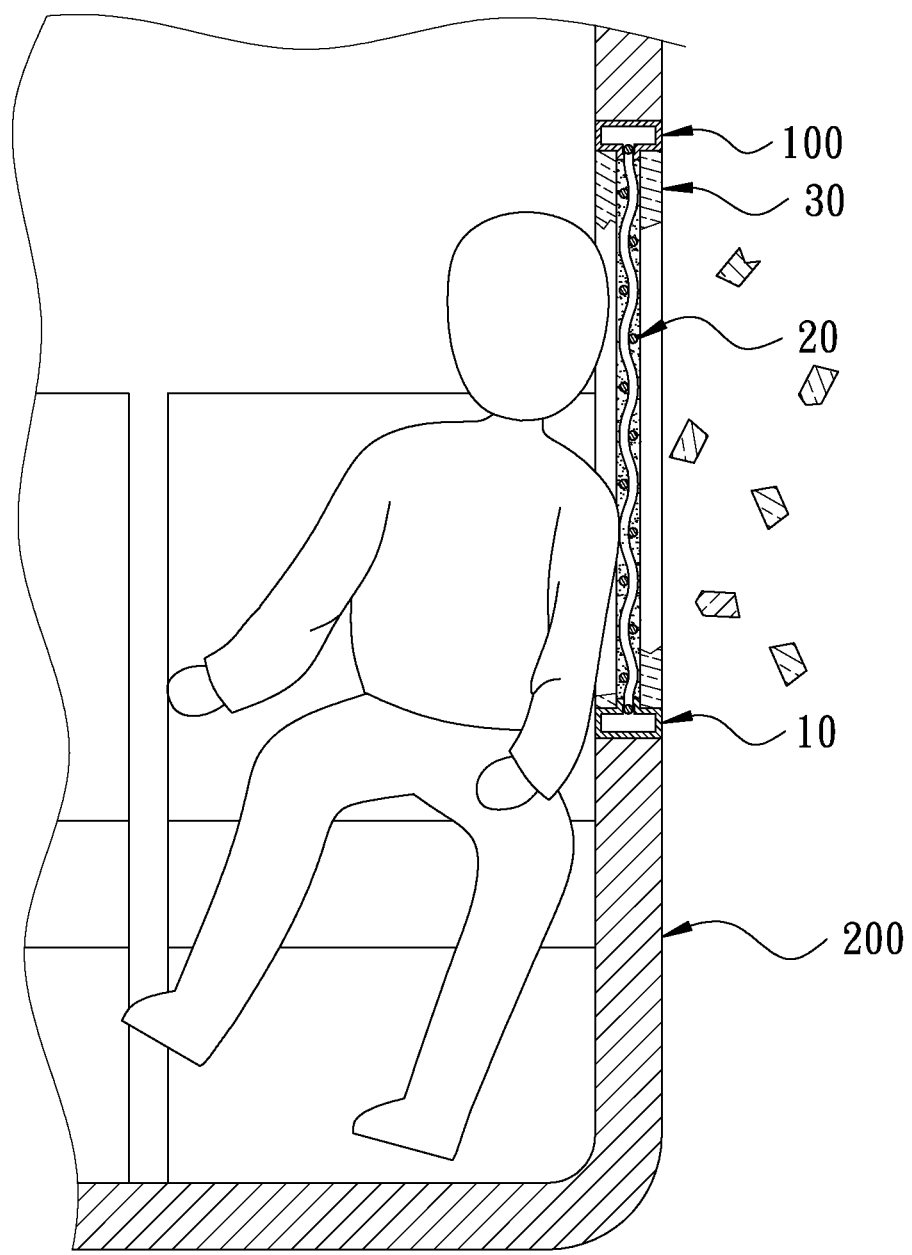
FIG. 8 is a further schematic view of the first embodiment of the present invention when in use.

FIG. 6, FIG. 7 and FIG. 8 are schematic views of the first embodiment of the present invention when in use. The vehicle window structure 100 for preventing a person from being thrown out may be applied to a vehicle 200 having a fixed window, such as a bus, a train, etc. The vehicle window structure 100 may be used as a general window in a normal state. The plastic rope 21 of the arresting net 20 is inserted in the passage 14 via the inlet 151 and then out of the passage 14 via the outlet 152, so that the plastic rope 21 is wound around and fixed to the fixing portions 15. That is, the arresting net 20 is directly connected and fixed to the fixing frame 10. When the vehicle 200 has an accidental rollover unfortunately, even if the light-permeable unit 30 is damaged or the fixing frame 10 is deformed during the overturning of the vehicle 200, the arresting net 20 is still able to close the opening 13 and withstand the impact force. The arresting net 20 is not separated from the fixing frame 10 by impact, so that the user can be effectively arrested to prevent the user from being thrown out of the vehicle, thereby improving the safety of the vehicle 200 greatly.

It is worth mentioning that the plastic rope 21 of the arresting net 20 is made of transparent nylon, so it can provide a soft cushioning function to avoid injury to the user. After the vehicle 200 stops rolling, the user or the rescuer can destroy the arresting net 20 easily with a simple tool to open the opening 13 for rescue or escape. The gap between the light-permeable plates 31 is filled with the glue layer 32. The transparent nylon itself has a light-permeable characteristic, so that it is not easy for the user to know the presence of the arresting net 20. It will not affect the light-permeable performance of the window or the scenery outside the car.

Figure 9:
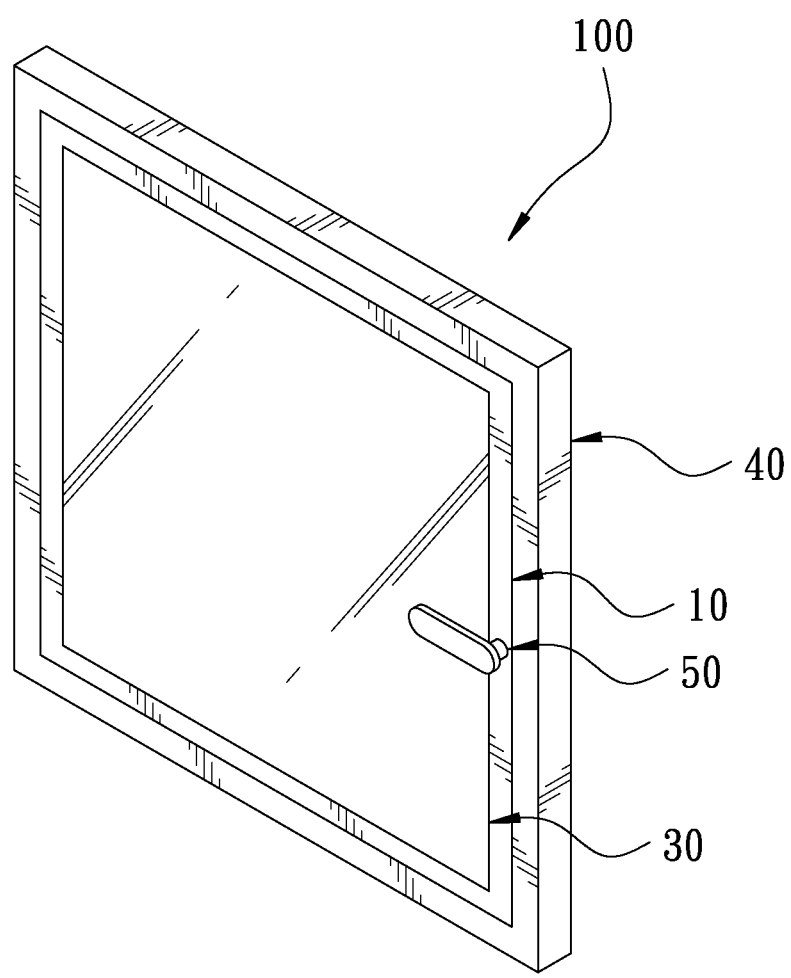
FIG. 9 is a perspective view in accordance with a second embodiment of the present invention.
Figure 10:
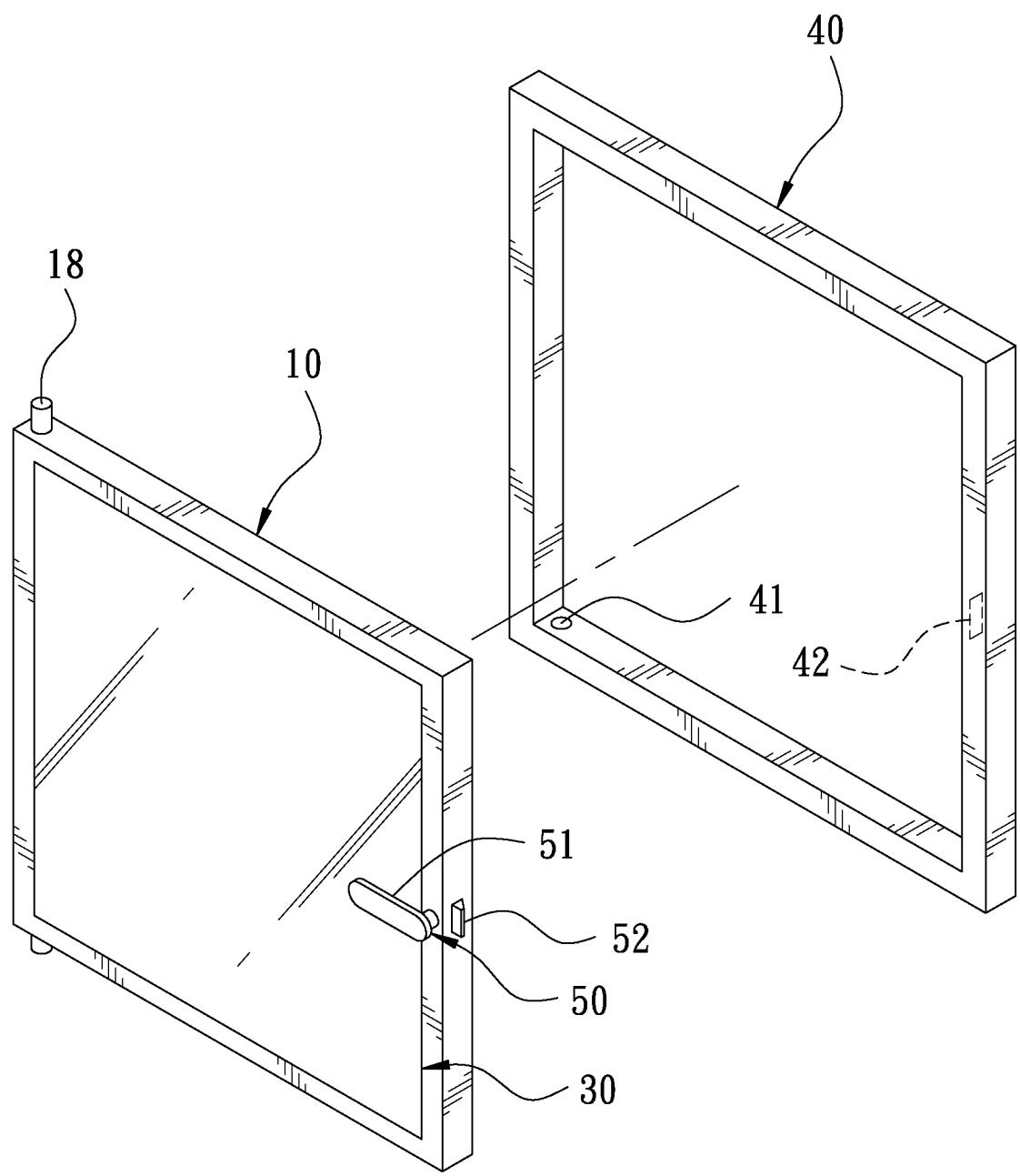
FIG. 10 is an exploded view in accordance with the second embodiment of the present invention.
Figure 11:
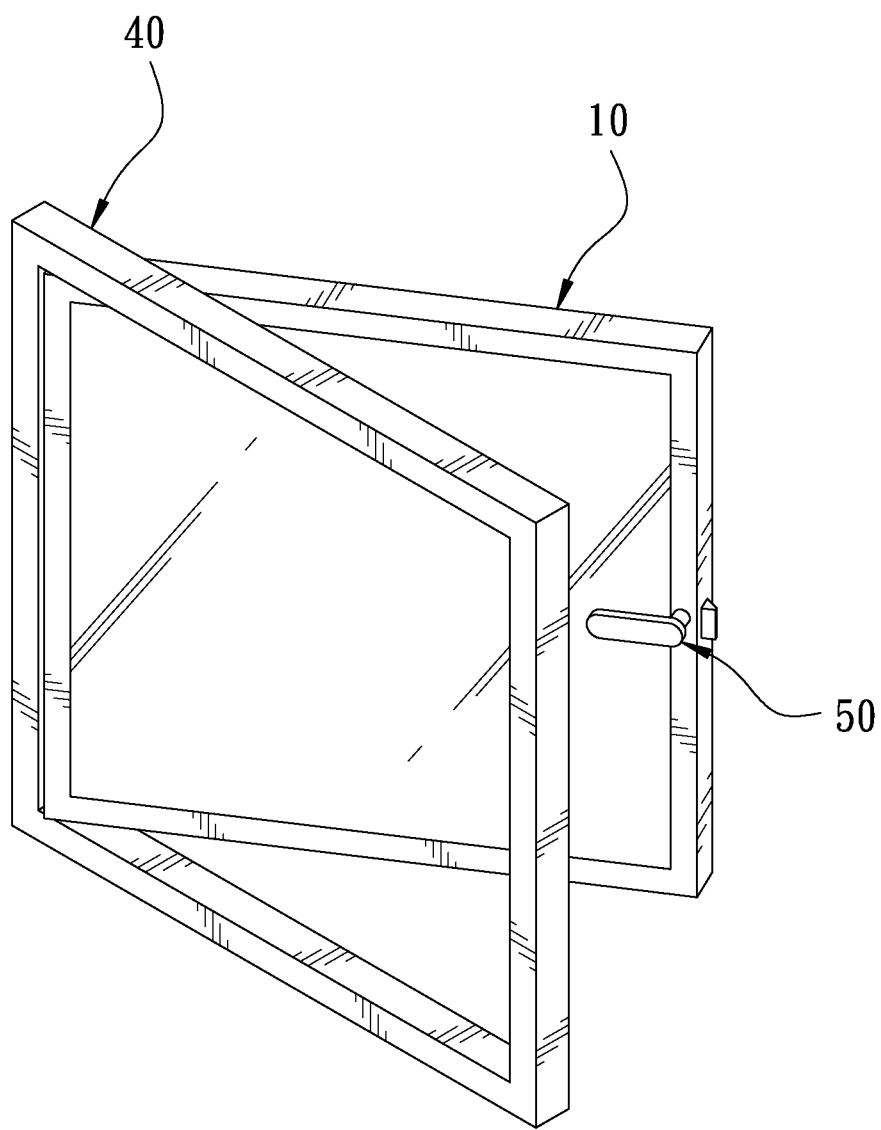
FIG. 11 is a schematic view in accordance with the second embodiment of the present invention when in use.

FIG. 9 is a perspective view in accordance with a second embodiment of the present invention. FIG. 10 is an exploded view in accordance with the second embodiment of the present invention. FIG. 11 is a schematic view in accordance with the second embodiment of the present invention when in use. The vehicle window structure 100 for preventing a person from being thrown out in accordance with the second embodiment is substantially similar to the first embodiment with the exceptions described hereinafter. The vehicle window structure 100 further includes an outer frame 40. The outer frame 40 has a pair of pivot holes 41. The fixing frame 10 has a pair of pivot posts 18 on the outer frame surface 11 corresponding to the pivot holes 41. The pivot posts 18 are pivotally connected to the pivot holes 41, such that the fixing frame 10 is rotatably connected to the outer frame 40. In addition, the outer frame 40 further has a limiting hole 42. The vehicle window structure 50 further includes a limiting unit 50. The limiting unit 50 has a handle 51 that is rotatably disposed on the fixing frame 10. The handle 51 is connected to a limiting protrusion 52. The limiting protrusion 52 is inserted through the limiting hole 42. If the light-permeable unit 30 is not damaged in an accident, the user can operate the handle 51 of the limiting unit 50 to disengage the limiting protrusion 52 from the limiting hole 42 and to turn the fixing frame 10 relative to the outer frame 40 to open the window.

Figure 12:
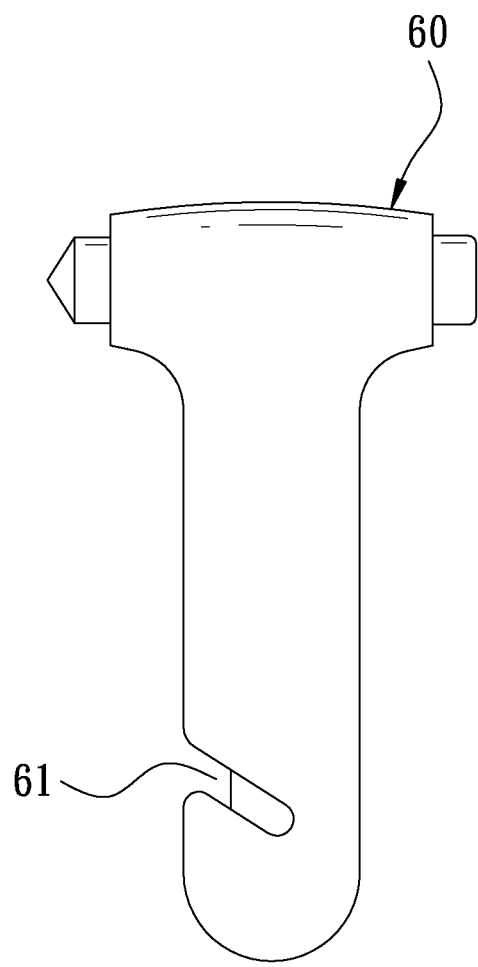
FIG. 12 is a schematic view of a widow smasher in accordance with a third embodiment of the present invention.

FIG. 12 is a schematic view in accordance with a third embodiment of the present invention. The vehicle window structure 100 for preventing a person from being thrown out in accordance with the third embodiment is substantially similar to the first and second embodiments with the exceptions described hereinafter. The vehicle window structure 100 further provides a window smasher 60. The window smasher 60 has a cutting opening 61 that is different from that of the prior art. The user can first break the light-permeable unit 30 through the window smasher 60 and then cut the arresting net 20 through the cutting opening 61 to escape.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vehicle window structure for preventing a person from being thrown out, comprising:
   a fixing frame, having an outer frame surface and an inner frame surface, an opening being defined within the inner frame surface, the fixing frame being provided with a plurality of fixing portions spaced apart along the inner frame surface;
   an arresting net, mounted and fixed within the inner frame surface to close the opening, the arresting net including at least one plastic rope fixedly connected to the fixing portions in an interlaced manner; and
   a light-permeable unit, mounted and fixed within the inner frame surface, the light-permeable unit covering the arresting net,
   wherein the fixing frame has a passage therein, the inner frame surface of the fixing frame has an inlet and an outlet corresponding to each of the fixing portions and communicating with the passage, and the plastic rope of the arresting net is inserted in the passage via the inlet and then out of the passage via the outlet so that the plastic rope is wound around and fixed to the fixing portions;

the fixing frame is further provided with at least two positioning portions passing through the inner frame surface for fixing two ends of the plastic rope; and the positioning portions are perforations passing through the inner frame surface and communicating with the passage, and after the two ends of the plastic rope are inserted in the passage via the positioning portions respectively, the two ends of the plastic rope are tied to form knot portions each having a diameter greater than that of the positioning portions.

2. The vehicle window structure as claimed in claim 1, wherein the plastic rope is made of nylon.

3. The vehicle window structure as claimed in claim 1, wherein the light-permeable unit includes two light-permeable plates respectively disposed at two sides of the arresting net, and the arresting net is sandwiched between the light-permeable plates.

4. The vehicle window structure as claimed in claim 3, wherein two sides of the fixing frame are provided with annular fixing grooves corresponding to the opening, the light-permeable plates are fixed to the annular fixing grooves respectively, and a glue layer is provided between the light-permeable plates.

5. The vehicle window structure as claimed in claim 3, wherein the light-permeable plates are made of glass.

6. A vehicle window structure for preventing a person from being thrown out, comprising:

a fixing frame, having an outer frame surface and an inner frame surface, an opening being defined within the inner frame surface, the fixing frame being provided with a plurality of fixing portions spaced apart along the inner frame surface;

an arresting net, mounted and fixed within the inner frame surface to close the opening, the arresting net including at least one plastic rope fixedly connected to the fixing portions in an interlaced manner;

a light-permeable unit, mounted and fixed within the inner frame surface, the light-permeable unit covering the arresting net; and an outer frame, the outer frame having a pair of pivot holes, the fixing frame having a pair of pivot posts on the outer frame surface corresponding to the pivot holes, the pivot posts being pivotally connected to the pivot holes so that the fixing frame is rotatably connected to the outer frame.

7. The vehicle window structure as claimed in claim 6, wherein the outer frame has a limiting hole, the vehicle window structure further includes a limiting unit, the limiting unit has a handle that is rotatably connected to the fixing frame, the handle is connected to a limiting protrusion, and the limiting protrusion is inserted through the limiting hole.

8. A vehicle window structure for preventing a person from being thrown out, comprising:

a fixing frame, having an outer frame surface and an inner frame surface, an opening being defined within the inner frame surface, the fixing frame being provided with a plurality of fixing portions spaced apart along the inner frame surface;

an arresting net, mounted and fixed within the inner frame surface to close the opening, the arresting net including at least one plastic rope fixedly connected to the fixing portions in an interlaced manner; and a light-permeable unit, mounted and fixed within the inner frame surface, the light-permeable unit covering the arresting net, wherein the light-permeable unit includes two light-permeable plates respectively disposed at two sides of the arresting net, and the arresting net is sandwiched between the light-permeable plates; and two sides of the fixing frame are provided with annular fixing grooves corresponding to the opening, the light-permeable plates are fixed to the annular fixing grooves respectively, and a glue layer is provided between the light-permeable plates.

9. The vehicle window structure as claimed in claim 8, wherein the light-permeable plates are made of glass.

10. The vehicle window structure as claimed in claim 8, wherein the plastic rope is made of nylon.

* * * * *